United States Patent Office 3,560,969
Patented Feb. 2, 1971

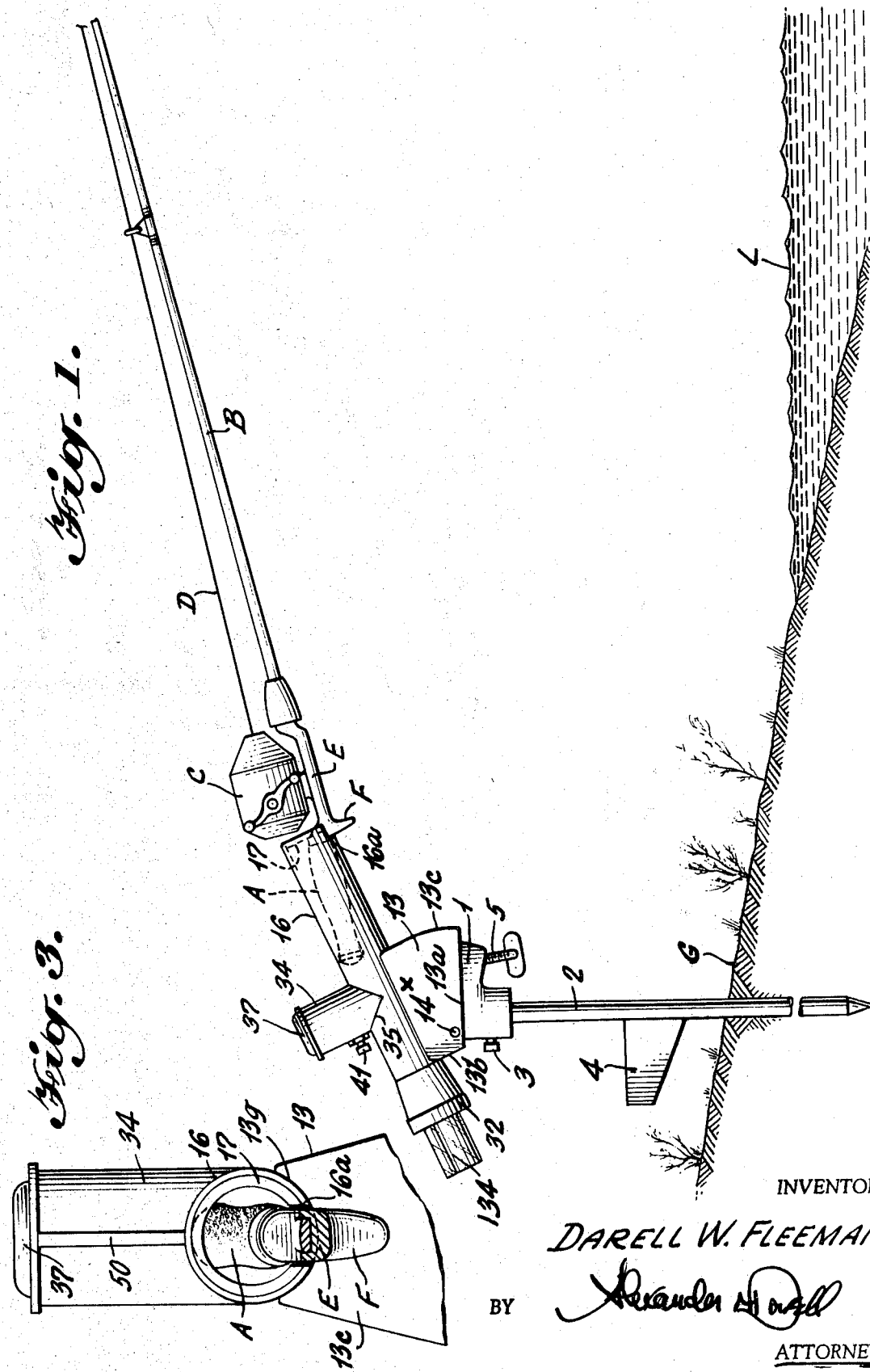

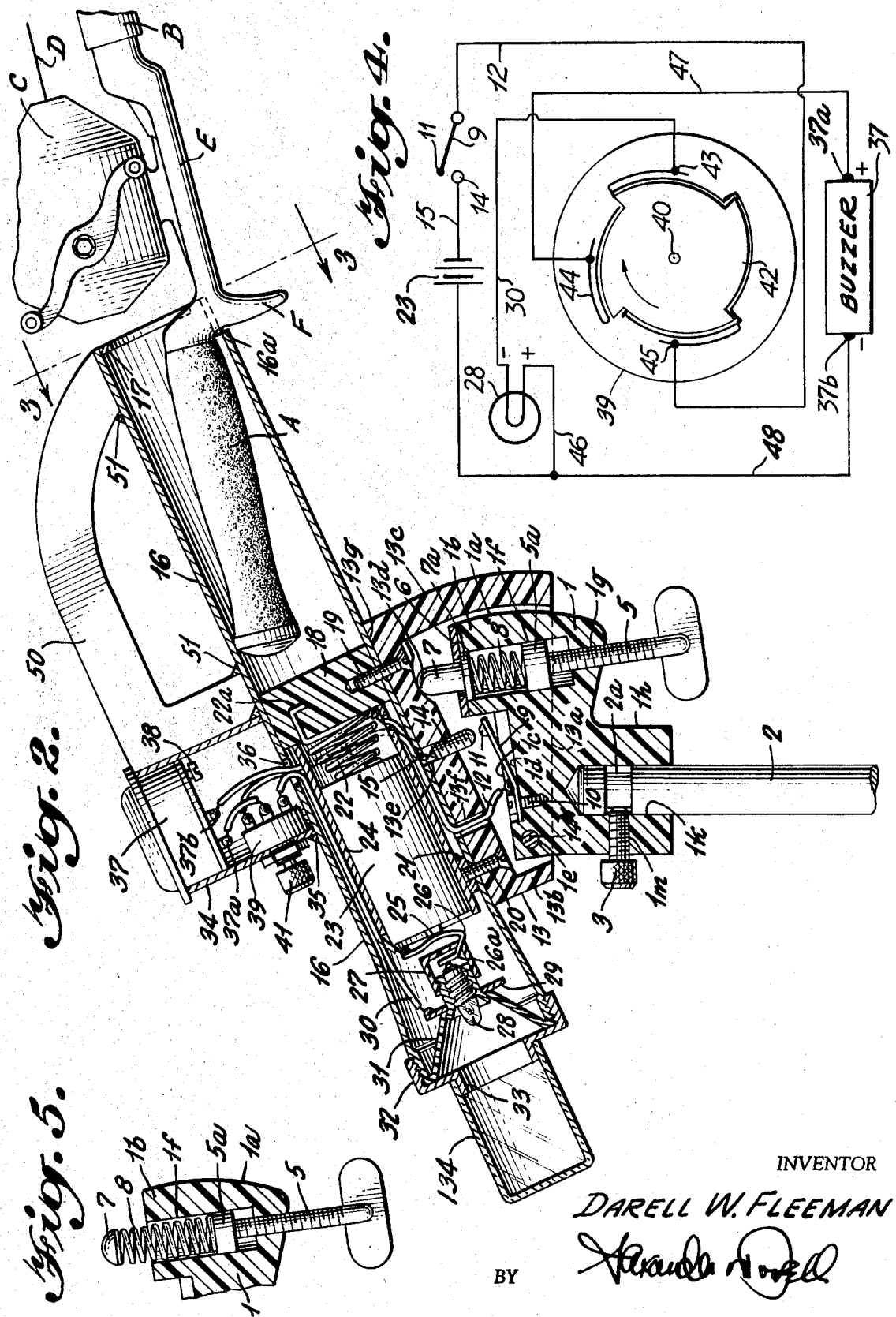

3,560,969
COMBINED FISHING ROD HOLDER AND
SIGNAL DEVICE
Darell W. Fleeman, Rte. 1, Fair Play, Mo. 65649
Filed Aug. 23, 1968, Ser. No. 754,813
Int. Cl. A01k 97/10, 97/12; G08h 71/00
U.S. Cl. 340—421                                   18 Claims

ABSTRACT OF THE DISCLOSURE

A novel combined fishing rod holder and signal means which will provide the fisherman with a device which will hold his fishing rod for him, the device being swivelly mounted on a stake or the like driven into the bank close to the water, or mounted on a boat while fishing from a boat, the device having means which will signal the fisherman that a fish is biting or is caught on the hook and line by a visible light signal, an audible sound signal, or by both at the same time, the device being positioned so as to swivel on the support stake, allowing the fisherman at night to determine the direction in which the fish is biting on the line so that the fisherman can manipulate his rod and set the hook in the fish's mouth. Alternatively, the support stake can be fitted into a bracket or clamp fastened to a boat.

---

The combined fishing rod holder and signal device has a lower base swivelly mounted on a vertical support rod, the lower base having a yieldable upwardly acting plunger extending upwardly from its front end and having means for vertically adjusting the plunger on the lower base. An upper base is pivotally mounted adjacent its rear end on the top of the lower base with the upper end of the plunger engaging the underside of the upper base. A tube is secured on the upper base extending beyond both ends thereof, the tube having a transverse wall intermediate its ends forming a fishing rod handle receiving chamber at the front end of the tube, the tube having an electric visual signal disposed in its rear end, with a dry-cell battery yieldably interposed between the visual signal and the transverse wall. The tube also has a cylindrical extension on its top communicating with the tube in rear of the transverse wall, and the extension is closed at its upper end by an electric audible signal, the extension also housing an electric switch which has an operating knob extending through the wall thereof. A fixed contact is provided on the underside of the upper base and a second contact carried by leaf spring is secured to the top of the lower base and adapted to engage the fixed contact when the upper base is swung downwardly against the action of the plunger. An electric circuit is provided including the electric switch, the visual signal, battery audible signal, and said contacts whereby when the contacts are engaged and the switch is in an "on" position, the visual signal and audible signal will be actviated individually according to certain settings of the switch knob, and will further be activated collectively according to another setting of the switch knob.

I will explain the invention with reference to the accompanying drawings which illustrate one practical embodiment thereof to enable others familiar with the art to adopt and use the same, and will summarize in the claims the novel features of constructions and novel combinations of parts, for which protection is desired.

In said drawings:

FIG. 1 is an elevational view of my combined fishing rod holder and signal means, showing the fishing rod supported therein, and showing the device mounted upon the support stake.

FIG. 2 is an enlarged vertical longitudinal sectional view through the support shown in FIG. 1.

FIG. 3 is a section on the line 3—3, FIG. 2.
FIG. 4 is a diagrammatic view of the electric circuit.
FIG. 5 is a detail of a modification.

As shown in the drawings, my novel device preferably comprises a base member 1 consisting of a substantially rectangular block formed of plastic or other nonelectrical conducting material having its front face 1a curved on an arc concentric with a horizontal pivot pin 14x for the purpose hereinafter described, the front end having a raised lug 1b terminating above the level of the rear portion 1c of the top of the base 1, as shown in FIG. 2. In the surface 1c behind the lug 1b is a recess 1d extending towards the rear end of the base 1 but terminating short thereof.

In the rear upper portion of the base 1 is a horizontal bore 1e for the purpose hereinafter described. Extending down into the base 1 through the lug 1b is a bore 1f, the axis of which is inclined from the vertical slightly upwardly and rearwardly of the base 1, the bore terminating above the lower end of the base 1. A reduced tapped bore 1g extends axially from the bottom of bore 1f through the bottom of the base 1f for the purpose hereinafter described. Extending downwardly from the rear end of the base 1 is a cylindrical lug 1h having a vertical bore 1k therein, its upper end terminating below the upper face of the base 1; and extending inwardly from the rear end of the lug 1h is a threaded bore 1m crossing the bore 1k below the upper end of the bore 1k.

The bore 1k is adapted to receive the upper end of a support stake 2 adapted to be driven into the ground G, as shown in FIG. 1, or mounted by a bracket or clamp in a boat (not shown). The stake 2 is provided adjacent its upper end with an annular recess 2a opposite the bore 1m, and a screw 3 is tapped into the bore 1m and engages in the annular groove 2a to prevent separation of the base 1 from the support stake 2 when the screw is thus engaged, while permitting rotation of the base 1 on the stake 2.

If desired, a foot or hand rest 4 may be provided on the stake 2 adjacent the ground to facilitate the operator driving the stake into the ground adjacent the edge of a lake L or the like where he desires to fish.

Threaded into the bore 1g in base 1 is a thumb screw 5 having on its upper end within the bore 1f a head 5a, FIG. 2. At the upper end of the bore 1f is a plate 6 having a hole therein coaxial with bore 1f receiving a plunger 7 having on its lower end below plate 6 a head 7a to prevent the plunger from passing upwardly out of the bore 1f. Interposed between the head 7a of the plunger and the head 5a of the screw 5 is a spring 8 whereby the upward pressure on the plunger 7 may be varied by merely rotating the thumb screw 5 in the proper direction.

Within the recess 1d in base 1 is positioned a leaf spring 9, the same being retained in recess 1d by means of a screw 10 disposed at the rear end of the spring 9, the forward end of the spring being bent upwardly as shown in FIG. 2 and carrying a contact point 11. A conductor wire 12 extends from the spring 9, as shown in FIG. 2, for the purpose hereinafter described.

Above the base 1 is a pivotal member 13 having side skirt portions 13a embracing the upper end of the base 1, and having a rear skirt portion 13b connecting the side skirt portions 13a at the rear end of the member 13, and having a front skirt portion 13c connecting the front of the side skirt portions 13a, the inner wall of the front skirt portion 13c being arcuately shaped to conform with the arcuate face 1a of the base 1, the skirt portions of the member 13 receiving and embracing the upper end of the base 1, as shown in FIG. 2.

A pivot pin 14x extends through the rear horizontal bore 1e of the base 1 and through bores in the rear portions of the side skirt portions 13a of member 13 to pivot the member 13 on the base 1 whereby the member 13 may assume different vertical angularities with respect to the base 1, the pivoting action being controlled normally by the upper end of the plunger 7 which engages a shallow recess 13d in the underside of the top of the member 13, as shown in FIG. 2. By the above construction, adjusting the thumb screw 5 will cause the member 13 to assume different vertical angularities with respect to the base 1.

Instead of using a spring 8 and plunger 7 passing through the plate 6 shown in FIG. 2, the plate 6 may be omitted across the upper end of the bore 1f and the plunger 7 secured by welding or the like to the outer end of the spring 8, while the lower end of the spring 8 is welded to the head 5a of the thumb screw 5. In this manner the member 13 may be permitted to have a much greater vertical angular adjustment with respect to the base member 1 than the construction shown in FIG. 2.

Adjustably mounted in a threaded portion 13 in the top of the member 13 in alignment with the contact member 11 of leaf spring 9 is a second contact 14, which contact is threaded into the tapped bore 13e so as to be adjustable with respect to the contact 11. The upper end of contact 14 is connected to a wire 15 hereinafter referred to. Extending through the top of the member 13 is a bore 13f for the passage therethrough of a wire 12 hereinafter referred to. In the upper outer surface of the member 13 is a parti-cylindrical longitudinally extending groove 13g, FIGS. 2 and 3, for the purpose hereafter described.

Seated in the parti-cylindrical groove 13g in the upper end of the member 13 is a cylindrical tube 16 which is open at its forward end as shown, the forward end extending beyond the front end of the member 13 sufficiently to receive the handle A of the fishing rod B, which is provided with usual reel C provided with the usual hand brake for the fishing line D, the reel C being mounted upon an offset portion E of the rod, the rear end of the portion E having the usual finger-receiving lug F depending from its end adjacent handle A, as shown in FIGS. 1, 2 and 3.

Preferably the outer end of the member 16 is provided with a longitudinal slot 16a of width and length adapted to receive the finger lug F. When the handle A is inserted in the member 16, as shown in FIGS. 2 and 3, the lug F then holds the fishing rod B against rotation in the sleeve 16.

The outer end of the tube 16 is reinforced by a metallic split-ring member 17, the mating ends of which terminate at the sides of the slot 16a, the ring 17 being secured in the end of the flexible sleeve 16 in any desired manner.

Within the tube 16 rearwardly of the end of the handle A and disposed approximately opposite the arcuate flange 13c of member 13 is a plastic water sealing wall 18 which is fixedly secured therein. In order to mount the tube 16 on the member 13 a screw 19, FIG. 2, is passed through the top wall of member 13 and through the sleeve 16 and into the wall 18, thus locking the parts together.

Adjacent the rear end of the member 13 is a second screw 20 which is passed through the top wall of the member 13, as shown in FIG. 2, through the wall of the tube 16, and into a nut 21 or the like secured within the tube 16.

Seated upon the rear face of the wall or block 18 is a coiled spring 22 having its end adjacent the wall or block 18 anchored therein as at 22a, the opposite or rear end of the spring engaging a dry cell battery 23 within the tube 16 around which battery is a cardboard or other insulating sleeve 24, the battery 23 carrying a centrally disposed contact 25 at its rear end. Contact 25 engages a conductor strip 26 which is anchored in a light bulb socket 27 of insulating material, one leg 26a of the strip 26 being exposed at the inner center of the socket, while the other leg engages the contact 25. The socket 27 carries an electric light bulb 28 which is threaded into the socket in the usual manner with its rear central contact engaging the portion 26a of strip 26, while the outer metallic flange 29 of the socket 27 is connected by wire 30 in the electric circuit, as hereinafter described.

The socket 27 is supported axially of the sleeve 16 by a plastic conical reflector 31, FIG. 2, which is clamped between the rear end of the sleeve 16 and a collar 32 which is threaded onto the rear end of the sleeve 16, as shown in FIG. 2. Preferably the collar 32 has a central opening of relatively large size bounded by an annular flange 33 which supports an elongated plastic lens 134 (preferably colored red) so that when the bulb 28 is activated this fact will be readily apparent to the fisherman, night or day.

Upon the sleeve 16 at about the center thereof, but to the rear of the wall 18 is a cylindrical housing 34 which is open at the top, the walls of the housing 34 at the bottom being shaped to fit around the sides of the tube 16 and being welded or soldered thereto as at 35 so as to form an integral structure with the tube whereby the interior thereof may be maintained free of rain and moisture.

In the top of the tube 16 at the center of the housing 34 is an opening 36 for the passage therethrough of the wires of the electric circuit from the tube 16 into the housing 34. Closing the outer end of the housing 34 is a cylindrical buzzer 37 of the well-known bicycle type which preferably makes a tight sliding fit in the open end of the housing 34 to close the same and prevent entrance of rain or moisture into the housing 34, said buzzer being provided with the usual electric contacts 37a and 37b; also with an adjusting screw 38 whereby the tone of the buzzer 37 may be varied in the customary manner.

Within the housing 34 below the buzzer 37 is a switch 39 secured thereto in any desired manner, the same having a shaft 40 (FIG. 4) extending through the wall of the housing 34 provided on its outer end with a knob 41, the shaft 40 being fixedly connected to a wiper arm 42, FIG. 4, adapted to be rotated when the knob 41 is turned. In FIG. 4 the wiper arm 42 of the switch 39 is shown in the light "on" position. However, the switch 39 has a combination of three "on" contacts 43, 44 and 45, respectively, which are spaced apart and adapted to be engaged by the wiper arm 42 when rotated. As shown, the wiper 42 has a star-like shaped outer edge with only three sides connected together, the fourth side being dielectric. The wiper 42 is adapted to bridge any two or three adjacent contacts 43, 44 and 45 when rotated clockwise as shown in FIG. 4. Also, the wiper 42 may be positioned to contact only the hot contact 45 and the contact 43, completing the circuit to the light 28 through wire 30, for the light "on" position of the switch 39, as the wiper 42 of the switch 39 may be positioned to where the hot contact 45 and the contact 44 are the only two bridged for the buzzer "on" position. For the light and buzzer both to operate at the same time, the switch 39 can be positioned by the knob 41, to where the wiper 42 will contact all contacts 43, 44 and 45. Wire 46 is connected to the positive end of the light 28 and to wire 48 to complete the circuit when the light 28 is activated.

Referring to FIG. 4 in which the wiper 42 is in the light "on" position, contacts 43 and 45 are engaged so that only the light bulb 28 and not the buzzer 37 will be activated. However, when the wiper 42 is rotated clockwise sufficient to engage only the contacts 44 and 45 the buzzer 37 only will be activated, as the contact 44 is connected by wire 47 to one terminal of the buzzer 37a, the other contact of the buzzer 37b being connected by wire 48, FIG. 4, to one terminal of the battery 23, while the other terminal of the battery 23, is connected by wire 15 to the upper fixed contact point 14, which latter when engaging the bottom contact point 11 completes the circuit through the hot-wire 12 to the contacts 44 and 45.

When the wiper 42 is rotated further clockwise until it bridges the contacts 43, 44 and 45 of the switch 39, the light bulb 28 will remain lighted and the buzzer 37 will be simultaneously activated since the contact 44 is connected by wire 47, FIG. 4, to the contact 37a of the buzzer 37, while the other contact 37b of the buzzer is connected by wire 48 leading back to the battery 23.

When the wiper 42 is further rotated clockwise so that it bridges only the contacts 43 and 44 of the switch 39, the light bulb 28 will no longer be activated, and the buzzer 37 will not be activated since the contacts 43 and 44 are not bridged by the wiper 42 to the hot contact 45, as the dielectric side of the wiper arm 42, is now contacting 45 and there will be no current pass through the dielectric side to either contact 43 or 44. The switch is now in the "off" position.

By the above construction, the setting of the wiper 42 of the switch 39 by the knob 41 will determine whether the light bulb 28 alone, or the buzzer 37 alone, or both light bulb and buzzer, are simultaneously activated when the switch contacts 11–14 are closed. Any other wiring diagram which will accomplish the above purpose may be used instead of that specifically shown in FIG. 4.

If desired, a metallic handle 50, FIGS. 2 and 3, may be provided on the top of the sleeve extending between the housing 34 and the front end of the sleeve 16, the handle being bonded to the sleeve 16 and housing 34 as at 51, in any desired manner, and providing a suitable handle means for the transportation and manipulation of the device.

In operation, after the fisherman has found a likely fishing spot he may drive the support stake 2 into the bank near the lake L or body of water by putting pressure on the stake handle 4 and pushing it by hand or foot firmly into the ground G to support the device. He may then place the base 1 over the upper end of the stake 2, said upper end entering the bore 1k. If the fisherman prefers he can lock the device onto the stake by screwing the screw 3 into the base 1 sufficiently for the inner end thereof to enter the groove 2a of the support shaft to prevent separation of the base and stake. The fisherman may then bait the hook on the line D and cast the line and hook out into the water. He may then place the fishing rod handle A into the outer end of the sleeve 16 with the lug F entering the slot 16a and he may then set the brake of the reel C, taking up any slack from the line D. The fisherman may then adjust the plunger 7 by rotation of the thumb shaft 5 after adjusting the switch 39 by knob 41 to the light-on, horn-on, or both-on position.

Now that the weight of the rod and reel and the pull of the current are pulling down on the fishing line D, the fisherman will lower or unscrew the spring tension screw 5 until the contact points 14 and 11 come into contact, thereby completing the electric circuit to the switch 39 and causing the light bulb 28 to light-up, or the buzzer 37 to sound, or both to be activated simultaneously. Then the fisherman must reverse the screwing action on the thumb screw 5, causing the plunger 7 to move upwardly sufficiently until contacts 11 and 14 separate which causes the light or horn to become deactivated. At this adjusted position any slight tug on the line D will cause the light 28 to be activated or the buzzer 37 to sound off. If the fisherman desires more tension on the line in order to cause the device to signal he need merely screw the thumb screw 5 slightly further upwardly. It will be seen that when so adjusted any tug on the line by a fish will cause the sleeve 16 to pivot or lower on the base 1, causing the contacts 14 and 11 to meet and establish the electric circuit to the light bulb or horn, or both, depending upon the setting of the switch knob 41. If the thumb screw 3 is not screwed up tightly against stake 2 the device may swivel on the support stake 2 into whichever direction the fishing line D is pulled by the fish. This feature is particularly handy when fishing at night because if a fish is caught or is tugging on the fishing rod, the device will swivel in that particular direction telling the fisherman into which direction he should manipulate his rod in order to set the hook in the fish's mouth.

I do not limit my invention to the exact forms shown in the drawings, for obviously changes may be made therein within the scope of the claims.

I claim:

1. A combined fishing rod holder and signal device comprising a lower base adapted to be mounted adjacent its rear end on a substantially vertical support rod for rotation thereon; a yieldable upwardly acting plunger extending upwardly from the front end of the base; means for vertically adjusting the plunger on said base; an upper base pivotally mounted adjacent its rear end on the top of the lower base with the upper end of the plunger engaging the underside of the upper base; a sleeve secured to the top of the upper base and extending beyond both ends thereof; a transverse wall in said sleeve intermediate the ends thereof forming a fishing rod handle receiving chamber at the front end of the sleeve; an electric visual signal disposed in the rear end of the sleeve; a dry-cell battery yieldably interposed between the visual signal and transverse wall; a cylindrical extension on the top of and communicating with the sleeve in rear of the transverse wall; an electric audible signal closing the upper end of the said extension; an electric switch within the extension having an operating knob extending through the wall thereof; a fixed contact on the underside of the upper base; a second contact carried by a leaf spring secured to the top of the lower base and adapted to engage the fixed contact when the upper base is swung downwardly against the action of the plunger; and an electric circuit including the electric switch, visual signal, battery, audible signal, and said contacts whereby when the contacts are engaged and the switch is in an "on" position, the visual signal and audible signal will be activated individually according to certain settings of the switch knob, and will further be activated collectively according to another setting of the switch knob.

2. In a device as set forth in claim 1, said plunger being housed in a bore therefor extending downwardly from the top of the lower base, said bore having a reduced axially disposed threaded bore extending through the lower end of the lower base; a thumb screw in said threaded bore extending upwardly into said first bore; and a spring interposed between the lower end of the plunger and the upper end of the thumb screw.

3. In a device as set forth in claim 2, said spring being welded to the plunger and to the thumb screw.

4. In a device as set forth in claim 1, said upper base having a peripheral skirt therearound loosely receiving the upper portion of the lower base, said upper base being pivotally connected by a horizontal pin extending through the rear upper end of the lower base and through the sides of the skirt.

5. In a device as set forth in claim 1, said fishing rod handle having a laterally extending finger lug at its front end; and said sleeve having a slot in its outer end receiving said lug when the handle is positioned in the sleeve to prevent rotation of the handle therein.

6. In a device as set forth in claim 5, a split reinforcing ring in the outer front end of the sleeve, the ends of the split coinciding with the sides of the slot.

7. In a device as set forth in claim 1, an elongated colored lens closing the rear end of the sleeve.

8. In a device as set forth in claim 1, said lower base having a bore in its lower face receiving the upper end of the support rod; and a set screw in the base engaging an annular recess in the upper portion of the rod.

9. In a device as set forth in claim 1, said visual signal comprising an electric light bulb, and said audible signal comprising a buzzer; and said electric switch having three "on" contacts and having a rotatable wiper adapted to engage two or three adjacent switch contacts individually and simultaneously; the first contact of the switch being connected through the light bulb to one pole of the battery, the other pole being connected through the contacts of the base members to the wiper; the second contact being connected through the buzzer to one pole of the battery, the other pole being connected through the contact of the base members to the said wiper; and the other two contacts of the switch being made through the light bulb and buzzer to the said one pole of the battery, and the other pole being connected through the contacts of the base members to the said wiper.

10. A combined fishing rod holder and signal device comprising a lower base of plastic material adapted to be mounted adjacent its rear end on a substantially vertical support rod for rotation thereon; a yieldable upwardly acting plunger extending upwardly from the front end of the base; means for vertically adjusting the plunger on said base; an upper base of plastic material pivotally mounted adjacent its rear end on the upper end of the lower base; the upper end of the plunger engaging the underside of the upper base; a sleeve secured to the top of the upper base and extending beyond both ends thereof; a transverse wall in said sleeve intermediate the ends thereof forming a fishing rod handle receiving chamber at the front end of the sleeve; an electric light socket and reflector at the rear end of the sleeve; a dry-cell battery yieldably interposed between the light socket and transverse wall; a cylindrical extension of material on the top of and communicating with the sleeve in rear of the transverse wall; a buzzer closing the upper end of the said extension; an electric switch within the extension having an operating knob extending through the wall thereof; a fixed contact on the underside of the upper base; a second contact carried by a leaf spring secured to the top of the lower base and adapted to engage the fixed contact when the upper base is swung downwardly against the action of the plunger; and an electric circuit including the electric switch, light bulb, battery, buzzer and said contacts whereby when the contacts are engaged and the switch is in an "on" position, the light bulb and buzzer will be activated individually according to certain settings of the switch knob, and will further be activated collectively according to another setting of the switch knob.

11. In a device as set forth in claim 10, said plunger being housed in a bore therefor extending downwardly from the top of the lower base, said bore having a reduced axially disposed threaded bore extending through the lower end of the lower base; a thumb screw on said threaded bore extending upwardly into said first bore; and a spring interposed between the lower end of the plunger and the upper end of the thumb screw.

12. In a device as set forth in claim 11, said spring being welded to the plunger and to the thumb screw.

13. In a device as set forth in claim 10, said upper base having a peripheral skirt therearound loosely receiving the upper portion of the lower base, and pivotally connected by a horizontal pin extending through the rear upper end of the lower base and through the sides of the skirt.

14. In a device as set forth in claim 10, said fishing rod handle having a laterally extending finger lug at its front end; and said sleeve having a slot in its outer end receiving said lug when the handle is positioned in the sleeve to prevent rotation of the handle therein.

15. In a device as set forth in claim 14, a split reinforcing ring in the outer front end of the sleeve, the ends of the split coinciding with the sides of the slot.

16. In a device as set forth in claim 10, said electric switch having three "on" contacts and having a rotatable wiper adapted to engage two or three adjacent switch contacts individually and simultaneously; the first contact of the switch being connected through the light bulb to one pole of the battery, the other pole being connected through the contacts of the base members to the wiper; the second contact being connected through the buzzer to one pole of the battery, the other pole being connected through the contacts of the base members to the wiper; and the other two contacts of the switch being made through the light bulb and buzzer to one pole of the battery, the other pole being connected through the contacts of the base members to the wiper.

17. In a device as set forth in claim 10, an elongated colored lens closing the rear end of the sleeve.

18. In a device as set forth in claim 10, said lower base having a bore in its lower face receiving the upper end of the support rod; and a set screw in the base engaging an annular recess in the upper portion of the rod.

References Cited

UNITED STATES PATENTS

| 2,581,671 | 1/1952 | Katter | 43—21.2 |
| 2,909,860 | 10/1959 | Braum | 43—17 |
| 3,037,314 | 6/1962 | Hardy | 43—21.2X |
| 3,156,997 | 11/1964 | Smith | 43—17 |
| 3,228,135 | 1/1966 | Kricksfeld et al. | 43—17 |

DONALD J. YUSKO, Primary Examiner

P. PALAN, Assistant Examiner

U.S. Cl. X.R.

43—17, 21.2